United States Patent
Lee

(10) Patent No.: US 11,073,399 B2
(45) Date of Patent: Jul. 27, 2021

(54) METHOD FOR ESTIMATING POSITION OF EGO VEHICLE FOR AUTONOMOUS DRIVING AND AUTONOMOUS DRIVING APPARATUS

(71) Applicant: ThorDrive, Inc., Mountain View, CA (US)

(72) Inventor: Soomok Lee, Kunpo (KR)

(73) Assignee: THORDRIVE, INC., Mountain View, CA (US)

( * ) Notice: Subject to any disclaimer, the term of this patent is extended or adjusted under 35 U.S.C. 154(b) by 345 days.

(21) Appl. No.: 16/262,289

(22) Filed: Jan. 30, 2019

(65) Prior Publication Data

US 2019/0234745 A1 Aug. 1, 2019

Related U.S. Application Data

(60) Provisional application No. 62/624,978, filed on Feb. 1, 2018.

(51) Int. Cl.

| | |
|---|---|
| *G01C 21/30* | (2006.01) |
| *G05D 1/02* | (2020.01) |
| *G01C 21/28* | (2006.01) |
| *G01C 21/36* | (2006.01) |
| *G05D 1/00* | (2006.01) |
| *G01C 21/32* | (2006.01) |

(52) U.S. Cl.
CPC ............. *G01C 21/30* (2013.01); *G01C 21/28* (2013.01); *G01C 21/32* (2013.01); *G01C 21/3602* (2013.01); *G05D 1/0055* (2013.01); *G05D 1/0246* (2013.01); *G05D 1/0274* (2013.01)

(58) Field of Classification Search
CPC .................................... G01S 5/16; G06T 7/70
See application file for complete search history.

(56) References Cited

U.S. PATENT DOCUMENTS

| 9,043,072 B1* | 5/2015 | Tisdale | G05D 1/021 |
| | | | 701/28 |
| 2012/0136549 A1* | 5/2012 | Bradai | B60W 40/072 |
| | | | 701/93 |
| 2017/0364090 A1* | 12/2017 | Grufman | G05D 1/0214 |
| 2019/0101649 A1* | 4/2019 | Jensen | G05D 1/0278 |
| 2019/0120948 A1* | 4/2019 | Yang | G01C 21/165 |

* cited by examiner

*Primary Examiner* — Kevin P Mahne
(74) *Attorney, Agent, or Firm* — LRK Patent Law Firm

(57) ABSTRACT

The present invention relates to a method for estimating a position of an ego vehicle for autonomous driving including the steps of: receiving first sensor inputs from first sensors to extract visual road information; allowing the extracted visual road information to match first map data to produce a first matching score group; receiving second sensor inputs from second sensors; allowing the received second sensor inputs to match the second map data to produce a second matching score group; checking whether the first matching score group is consistent to the second matching score group; and estimating any one of the position candidates in the position candidate group of the ego vehicle as the position of the ego vehicle according to the consistency checking result.

8 Claims, 10 Drawing Sheets

(a)

(b)

METHOD FOR ESTIMATING POSITION OF EGO VEHICLE FOR AUTONOMOUS DRIVING AND AUTONOMOUS DRIVING APPARATUS

CROSS REFERENCE TO RELATED APPLICATION

This application claims the benefit of U.S. Provisional Application No. 62/624,978, filed Feb. 1, 2018, which is hereby incorporated by reference in its entirety into this application.

BACKGROUND OF THE INVENTION

1. Field of the Invention

The present invention relates to a method for estimating a position of an ego vehicle for autonomous driving and an autonomous driving apparatus, and more particularly, to a method for estimating a position of an ego vehicle for autonomous driving and an autonomous driving apparatus that are capable of estimating a position of an ego vehicle through first sensor inputs received from first sensors and second sensor inputs received from second sensors.

2. Description of Related Art

Autonomous driving of a vehicle is a technology that is capable of sensing the vehicle's surrounding environment and dangerous elements to set a driving path and further to control the vehicle's driving on the basis of the set driving path, and the autonomous driving technology is developed to minimize the intervention of a human driver.

An autonomous driving vehicle having a lane-assisting function is first attempted, and recently, an autonomous driving vehicle having a full autonomous driving function becomes commercialized. If an error occurs on setting of an autonomous driving path, however, unintended accidents may happen frequently, and accordingly, it is considered that the full autonomous driving function is not perfect. So as to solve such problems, many studies and developments have been made.

The autonomous driving path is set basically by receiving data from sensors installed on a vehicle, analyzing the received data, and estimating the future position of the vehicle, and in conventional practices, accordingly, the autonomous driving path is set by receiving images or image data from one kind of sensors, for example, camera sensors, and by analyzing the received images or data. If the corresponding sensor does not work, however, there is no sensor capable of replacing the broken sensor, thereby making it impossible to set the autonomous driving path. If an error occurs on the data received from the sensor, further, it is possible to set the autonomous driving path, but the accuracy of the set autonomous driving path is remarkably decreased, thereby undesirably raising possibility of an accident.

Therefore, there is a need for a technology capable of accurately estimating a future position of an ego vehicle to set an autonomous driving path having no possibility of an accident and high reliability, even if a sensor does not work or an error occurs on data received from the sensor.

SUMMARY OF THE INVENTION

Accordingly, the present invention has been made in view of the above-mentioned problems occurring in the prior art, and it is an object of the present invention to provide a method for estimating a position of an ego vehicle for autonomous driving and an autonomous driving apparatus that are capable of accurately estimating a future position of the ego vehicle to set an autonomous driving path, thereby ensuring reliability of a full autonomous driving function.

The technical problems to be achieved through the present invention are not limited as mentioned above, and other technical problems not mentioned herein will be obviously understood by one of ordinary skill in the art through the following description.

To accomplish the above-mentioned object, according to a first aspect of the present invention, there is provided a method for estimating a position of an ego vehicle for autonomous driving, the method including the steps of: receiving first sensor inputs from first sensors to extract visual road information from the first sensor inputs by means of an autonomous driving apparatus; allowing the extracted visual road information to match first map data to produce a first matching score group having first matching scores calculated with respect to position candidates in a position candidate group of the ego vehicle by means of the autonomous driving apparatus; receiving second sensor inputs from second sensors as kinds of sensors different from the first sensors by means of the autonomous driving apparatus; allowing the received second sensor inputs to match the second map data to produce a second matching score group having second matching scores calculated with respect to position candidates in a position candidate group of the ego vehicle by means of the autonomous driving apparatus; checking whether the first matching score group is consistent to the second matching score group by means of the autonomous driving apparatus; and estimating any one of the position candidates in the position candidate group of the ego vehicle as the position of the ego vehicle according to the consistency checking result by means of the autonomous driving apparatus.

According to the present invention, desirably, the first sensors are camera sensors installed on the ego vehicle and the first map data is map data having visual road information, such as lane markers, road markers, curb and traffic sign.

According to the present invention, desirably, the second sensors are scanning sensors installed on the ego vehicle and the second map data is 3D point cloud map data.

According to the present invention, desirably, the ego vehicle position estimating method further includes, after the step of extracting the visual road information, the steps of: checking whether the extracted visual road information is effective; and checking whether the first map data is updated, and further includes, after the step of receiving the second sensor inputs, the steps of: checking whether the received second sensor inputs are effective; and checking whether the second map data is updated.

According to the present invention, desirably, the ego vehicle position estimating method further includes the steps of: calculating first matching accuracy of the visual road information and the first map data through the effectiveness checking result of the visual road information and the updating checking result of the first map data; and calculating second matching accuracy of the second sensor inputs and the second map data through the effectiveness checking result of the second sensor inputs and the updating checking result of the second map data.

According to the present invention, desirably, the ego vehicle position estimating method further includes the step of applying the first matching accuracy and the second matching accuracy as inputs of a weight-based probability coupling method to calculate a first weight for the first matching accuracy and a second weight for the second matching accuracy.

According to the present invention, desirably, the step of estimating any one of the position candidates as a position of the ego vehicle includes the steps of: if the consistency checking result is "NO", applying the first weight to the first matching scores calculated for the position candidates in the position candidate group of the ego vehicle and applying the second weight to the second matching scores calculated for the position candidates in the position candidate group of the ego vehicle to add the applied weights; and estimating the position candidate having the biggest added result as the position of the ego vehicle.

According to the present invention, desirably, the step of checking the consistency includes the steps of: calculating a difference between a probability distribution of the first matching score group and a probability distribution of the second matching score group by means of a probability distribution comparison method; and determining whether the calculated difference is over a given threshold value.

According to the present invention, desirably, the step of estimating any one of the position candidates as a position of the ego vehicle includes the steps of: if the consistency checking result is "YES", adding the first matching scores and the second matching scores calculated for the position candidates in the position candidate group of the ego vehicle; and estimating the position candidate having the biggest added result as the position of the ego vehicle.

To accomplish the above-mentioned object, according to a second aspect of the present invention, there is provided an autonomous driving apparatus for estimating a position of an ego vehicle, including: one or more processors; a network interface; a memory for loading a computer program implemented by the processors; and a storage for storing large-capacity network data and the computer program, wherein the computer program performs: an operation for receiving first sensor inputs from first sensors to extract visual road information from the first sensor inputs received; an operation for allowing the extracted visual road information to match first map data to produce a first matching score group having first matching scores calculated with respect to position candidates in a position candidate group of the ego vehicle; an operation for receiving second sensor inputs from second sensors as the kinds of sensors different from the first sensors; an operation for allowing the received second sensor inputs to match second map data to produce a second matching score group having second matching scores calculated with respect to position candidates in a position candidate group of the ego vehicle; an operation for checking consistency between the first matching score group and the second matching score group; and an operation for estimating any one of the position candidates in the position candidate group of the ego vehicle as the position of the ego vehicle according to the consistency checking result.

To accomplish the above-mentioned object, according to a third aspect of the present invention, there is provided a computer program stored in a medium in such a manner as to be coupled to a computing device to allow the computing device to execute the steps of: receiving first sensor inputs from first sensors to extract visual road information from the first sensor inputs received; allowing the extracted visual road information to match first map data to produce a first matching score group having first matching scores calculated with respect to position candidates in a position candidate group of an ego vehicle; receiving second sensor inputs from second sensors as the kinds of sensors different from the first sensors; allowing the received second sensor inputs to match second map data to produce a second matching score group having second matching scores calculated with respect to position candidates in a position candidate group of the ego vehicle; checking consistency between the first matching score group and the second matching score group; and estimating any one of the position candidates in the position candidate group of the ego vehicle as a position of the ego vehicle according to the consistency checking result.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
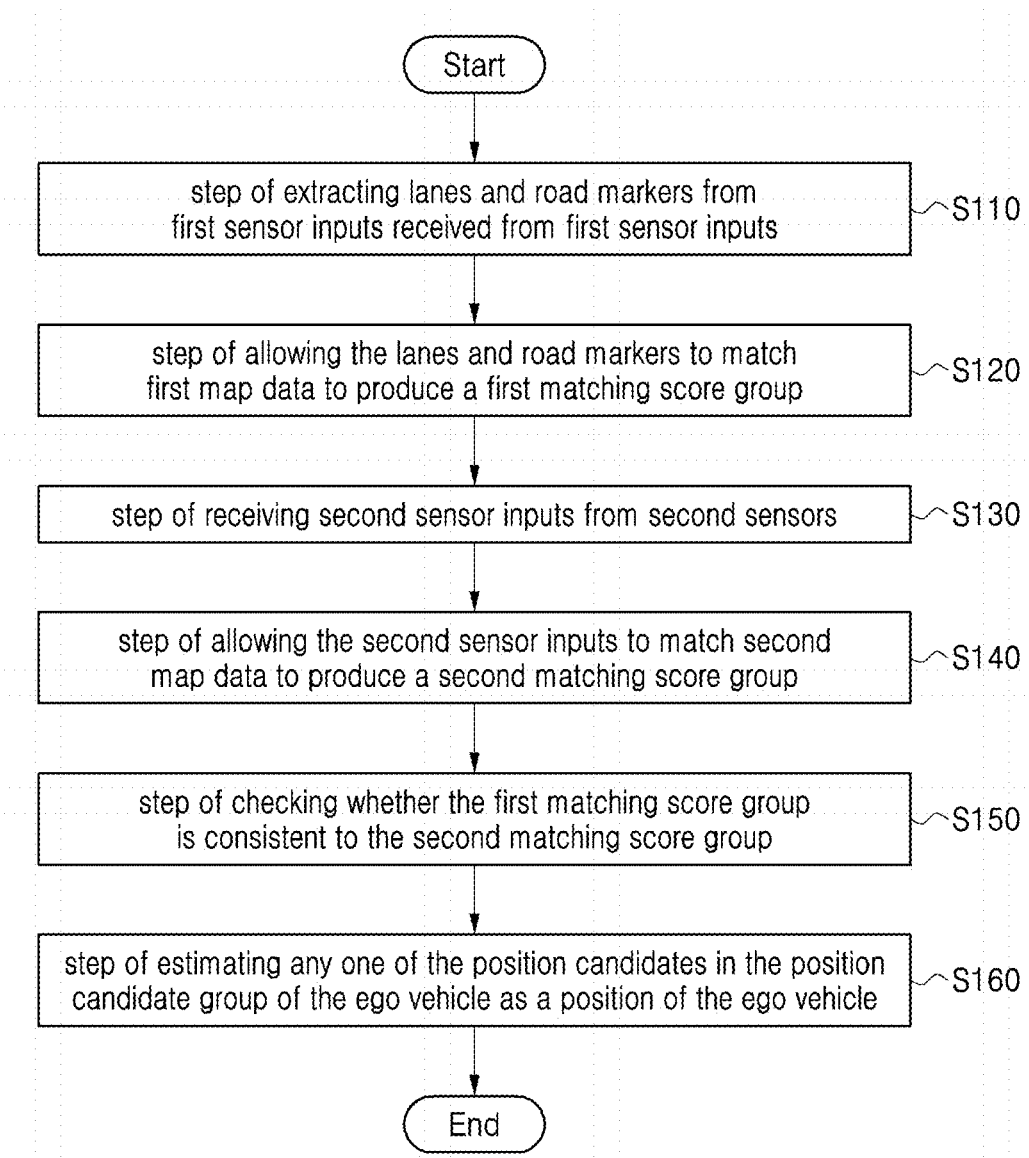
FIG. 1 is a flow chart showing representative steps in a method for estimating a position of an ego vehicle for autonomous driving according to a first embodiment of the present invention.

Hereinafter, the present invention is disclosed with reference to the attached drawings. Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. In the description, the corresponding parts in the embodiments of the present invention are indicated by corresponding reference numerals.

All terms used herein, including technical or scientific terms, unless otherwise defined, have the same meanings which are typically understood by those having ordinary skill in the art.

The terms, such as ones defined in common dictionaries, should be interpreted as having the same meanings as terms in the context of pertinent technology, and should not be interpreted as having ideal or excessively formal meanings unless clearly defined in the specification. An expression referencing a singular value additionally refers to a corresponding expression of the plural number, unless explicitly limited otherwise by the context.

In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Hereinafter, the present invention is in detail disclosed with reference to the attached drawings.

FIG. 1 is a flow chart showing representative steps in a method for estimating a position of an ego vehicle for autonomous driving according to a first embodiment of the present invention.

The flow chart as shown in FIG. 1 is desirable in accomplishing the objects of the present invention, but if necessary, of course, some steps may be added or removed.

On the other hand, the method for estimating a position of an ego vehicle for autonomous driving according to a first embodiment of the present invention as will be discussed later is carried out by means of an autonomous driving apparatus 100. The autonomous driving apparatus 100 is an independent apparatus which is mounted on a vehicle, and otherwise, it is built in a control device of the vehicle, as a form of a computer program stored in a medium, which will be discussed later.

Moreover, a term "ego vehicle" means a user or driver's own vehicle driven by him or her, which has the same meaning as a vehicle which has to set an autonomous driving path.

In step S110, first, the autonomous driving apparatus 100 receives first sensor inputs from first sensors 2 to extract visual road information such as lane markers, road markers, curb and traffic sign from the first sensor inputs.

In this case, the first sensors 2 are camera sensors installed on the ego vehicle 5. For example, the camera sensors are one or more sensors selected from a front sensing camera sensor installed on the front side of the ego vehicle 5, camera sensors for around view installed on side mirrors of the ego vehicle 5, and a rear sensing camera sensor installed on the rear side of the ego vehicle 5. If the first sensors 2 are any camera sensors installed on the ego vehicle 5, they do not matter.

On the other hand, since the first sensors 2 are camera sensors installed on the ego vehicle 5, the first sensor inputs received from the first sensors 2 are images or image data for the front, side, rear, and surrounding environment of the ego vehicle 5.

Figure 2:
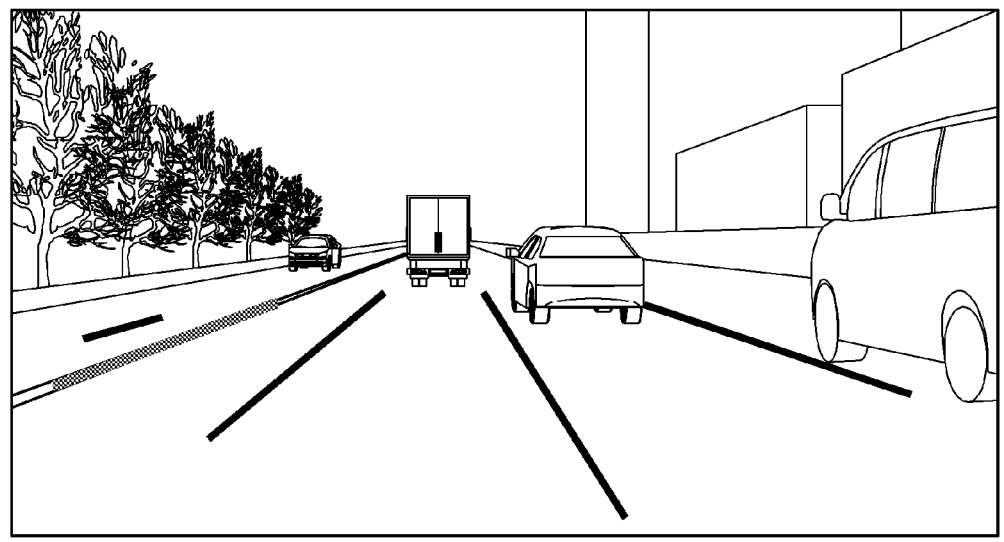
FIG. 2 is a photograph showing examples of first sensor inputs according to the present invention.
Figure 3:
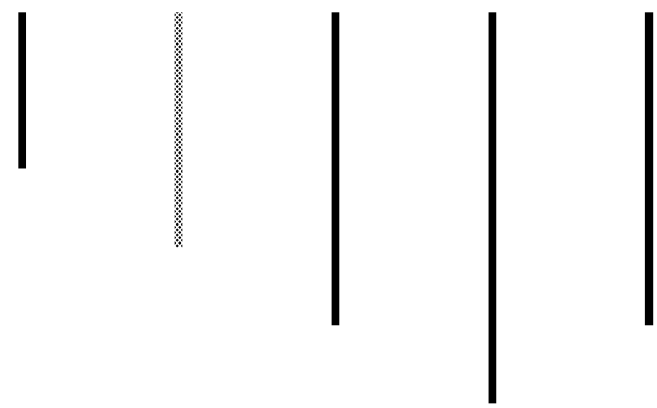
FIG. 3 shows lane markers, road markers, curb and traffic sign extracted from the first sensor input of FIG. 2.

The autonomous driving apparatus 100 extracts visual road information such as lane markers, road markers, curb and traffic sign from the first sensor inputs. FIG. 2 is a photograph showing examples of the first sensor inputs, and FIG. 3 shows visual road information, such as lane markers, road markers and traffic sign extracted from the first sensor inputs of FIG. 2.

In this case, the lane markers include all kinds of lane markers, such as, a solid line lane, a dashed line lane, a solid and dashed line lane, and a double line lane, and also, they include all colors of lanes, such as, a yellow lane, a white lane, a blue lane, and a road boundary like curb.

On the other hand, the road markers includes a left turn marker, a right turn marker, a straight and left turn marker, a straight and right turn marker, a prohibited straight marker, a prohibited left turn marker, a prohibited right turn marker, a stop marker, a U turn marker, a speed limit marker, a crosswalk marker on the road and further includes markers related to paths indicated on traffic signs.

Furthermore, the visual road information includes road information, such as, a stop line, a crossway, a curb boundary, and in the description, the lane markers, road markers and traffic sign as examples of the visual road information will be explained.

The visual road information including lane markers, road markers, curb and traffic sign are extracted by means of image processing, and for example, they are extracted from the first sensor inputs by means of a lane marker detection algorithm, a road marker, curb detection, or traffic sign detection algorithm using machine learning, deep learning, and a feature extraction or image filtering algorithm.

If the visual road information such as lane markers and road markers—are extracted from the first sensor inputs, in step S120, they match first map data by means of the autonomous driving apparatus 100 to produce a first matching score group having first matching scores calculated with respect to position candidates in a position candidate group of the ego vehicle.

Figure 4:
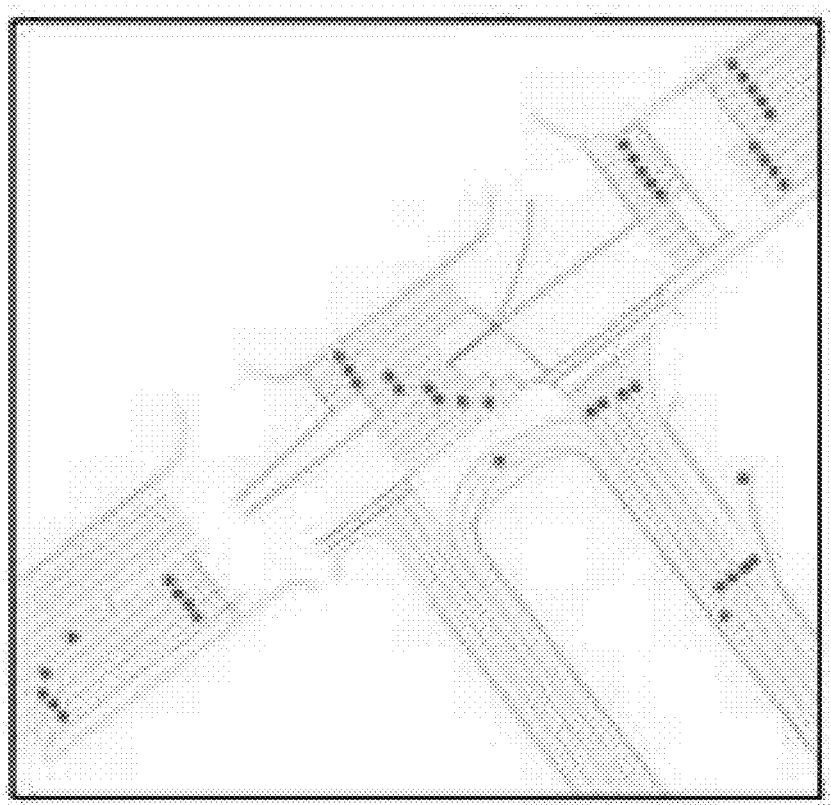
FIG. 4 shows an example of a road network map as first map data.
Figure 5:
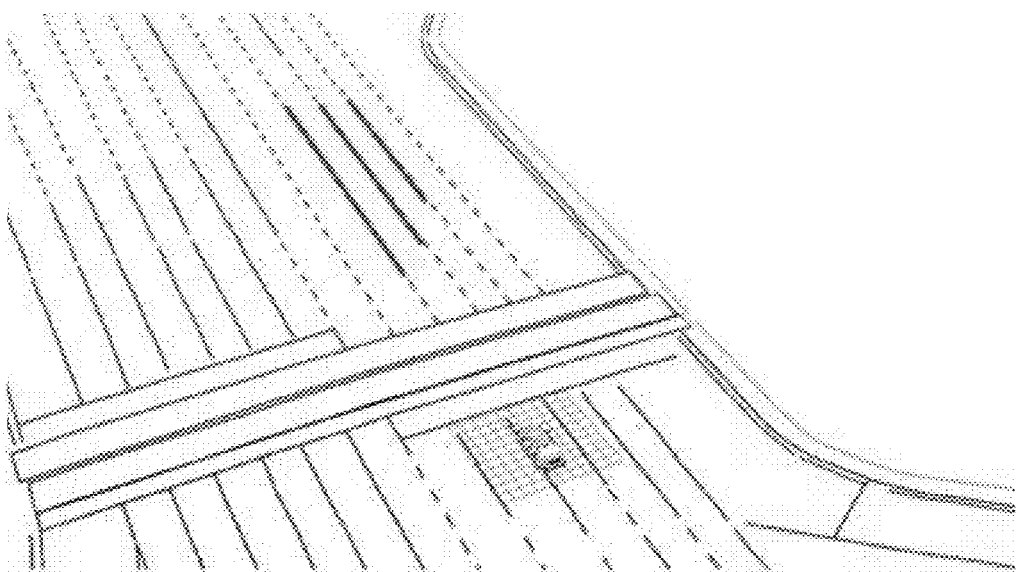
FIG. 5 shows an example of a local road network map on which the lane markers, road markers, curb and traffic sign extracted from the first sensor input match the first map data.

In this case, the first map data is map data having the visual road information such as lane markers, road markers, curbs and traffic sign—, which is called road network map. FIG. 4 shows an example of the road network map as the first map data, and FIG. 5 shows an example wherein the extracted lane markers, road markers, curbs and traffic sign match the road network map, which is called local road network map.

On the other hand, the position candidate group of the ego vehicle 5 is a group from a current position to estimable positions to be located after moving for a given period of time, which is produced by means of the results obtained by allowing visual road information such as the extracted lane markers and road markers to match the first map data. For example, if the visual road information such as extracted lane markers, road markers, curb and traffic sign—are a left turn marker, a right turn marker, and a straight marker, the position candidate group of the ego vehicle 5 includes a position a after a left turn, a position b after a right turn, and a position c after straight, and the autonomous driving apparatus 100 calculates the first matching scores for the respective position candidates.

Figure 6:
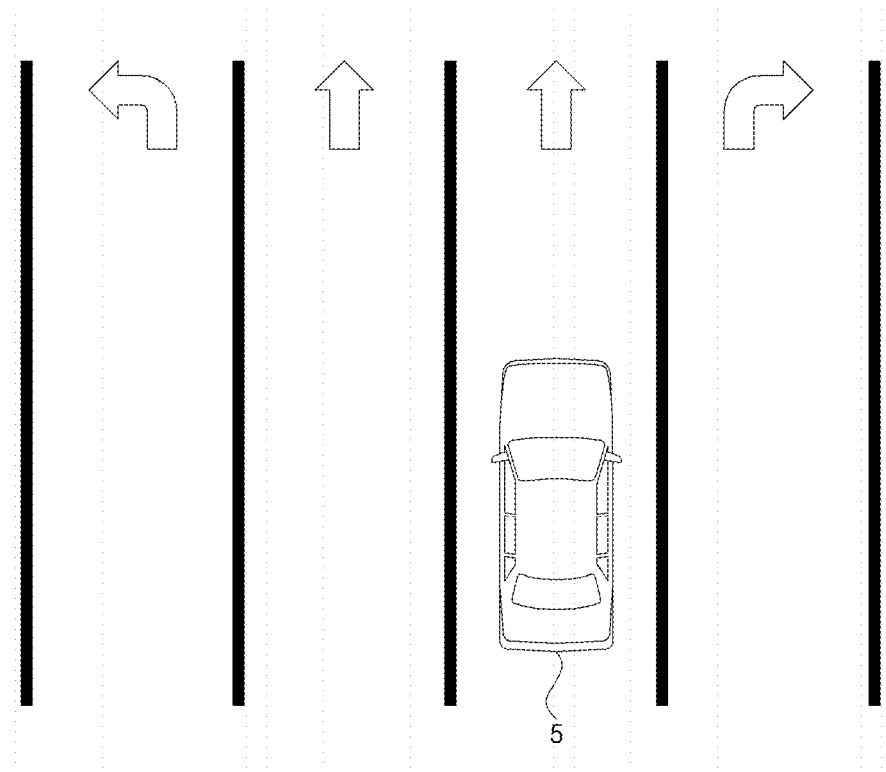
FIG. 6 shows an example of the lane markers, road markers, curb and traffic sign on a road along which the ego vehicle is currently driven to explain a method for producing a first matching score group.

In this case, the calculation of the first matching scores is carried out, while focusing on the visual road information such as lane markers, road markers, curb and traffic sign—on a road along which the ego vehicle 5 is currently driven, and FIG. 6 shows an example of the lane markers and road markers on a road along which the ego vehicle is currently driven.

Referring to FIG. 6, it can be checked that the ego vehicle 5 is driven on a third lane on a four-lane road, a left turn marker exists on a first lane, a straight marker on a second lane, a straight marker on a third lane, and a right turn marker on a fourth lane. In this case, the ego vehicle 5 is driven on the third lane on the four-lane road, and if it is assumed that the straight marker in front of the ego vehicle 5 and the right turn mark on the fourth lane are recognized by means of the first sensors 2 and the straight marker on the second lane is not recognized, the position candidate group includes the second lane, the third lane, and the fourth lane.

First, the position candidate a assumed as the second lane position corresponds to the straight marker on the first map data, thereby having a good first matching score, but since even the right turn marker on the fourth lane is recognized by means of the first sensors 2, the second lane position matches the straight marker on the third lane, so that the first matching score of the position candidate a becomes low. Contrarily, the position candidate b assumed as the third lane position corresponds to the straight marker and the right turn marker at the right side thereof on the first map data, thereby having a high first matching score. The position candidate c assumed as the fourth lane position recognizes the straight marker in front of the ego vehicle 5, even though the right turn marker exists, thereby having a low first matching score, and further, it recognizes the right turn marker on the right lane thereof. Since the position candidate c is the position candidate located on the fourth lane of the four-lane road, however, the first matching score of the position candidate c becomes much lower than before.

In detail, the first matching scores are calculated in the rank order of the first match score of the position candidate b assumed as the third lane position, the first match score of the position candidate a assumed as the second lane position, and the first match score of the position candidate c assumed as the fourth lane position. Accordingly, the position candidate b assumed as the third lane position has the highest first matching score.

As mentioned above, the method for producing the first matching score group explained with reference to FIG. 6 is just exemplary, and of course, the first matching score group may be produced through other methods. In all cases, however, the first matching score group is produced by means of the local road network map as the results obtained by allowing the visual road information including extracted lane markers, road markers, curb and traffic sign—to match the first map data.

Referring back to FIG. 1, the method for estimating the position of the ego vehicle will be explained.

If the first matching score group is produced, the autonomous driving apparatus 100 receives second sensor inputs from second sensors 4 as kinds of sensors different from the first sensors 2 in step S130.

Figure 7:
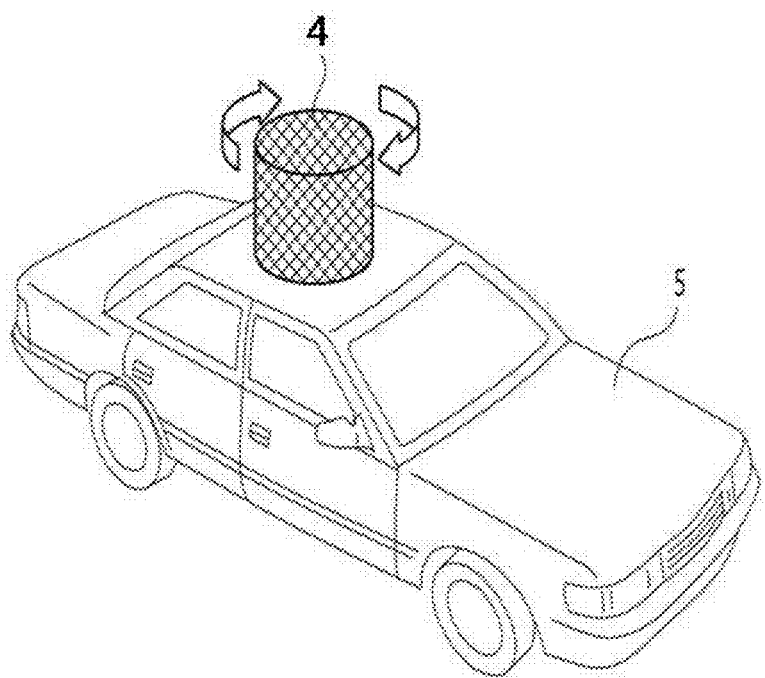
FIG. 7 is a perspective view showing an example of a LiDAR sensor mounted on the ego vehicle.

In this case, the second sensors 4 are scanning sensors installed on the ego vehicle 5, in more detail, LiDAR sensors. FIG. 7 is a perspective view showing an example of the LiDAR sensor mounted on the ego vehicle, and the LiDAR sensor is installed on a roof of the ego vehicle 5 to sense the ego vehicle 5 and the surrounding environment around the ego vehicle 5, in more detail, 360° view around the ego vehicle 5.

On the other hand, the second sensors 4 may be installed on another portion of the ego vehicle 5, and in this case, it should be installed at a relatively distant position from the ground so as to sense the ego vehicle 5 and the environment around the ego vehicle 5. For example, the second sensors 4 may be installed on a bonnet or trunk of the ego vehicle 5.

Figure 8:
FIG. 8 shows an example of second sensor inputs according to the present invention.

The second sensor inputs of the autonomous driving apparatus 100 received from the second sensors 4 are raw data, and FIG. 8 shows examples of the second sensor inputs according to the present invention. Referring to FIG. 8, the second sensor inputs include the ego vehicle 5 having the second sensors 4 installed on the center thereof, which is not omitted in the figure, and surrounding situations as objects existing around the ego vehicle 5 within a given distance.

On the other hand, the second sensor inputs as shown in FIG. 8 are provided with a top view for the ego vehicle 5 and the situations around the ego vehicle 5, but they are just exemplary. In some cases, of course, the second sensor inputs may be provided with a side or perspective view.

If the second sensor inputs are received, the autonomous driving apparatus 100 allows the second sensor inputs to match the second map data to produce a second matching score group having second matching scores calculated with respect to position candidates in a position candidate group of the ego vehicle in step S140.

In this case, the second map data is data on a map retained by the ego vehicle 5. The second map data is not limited in form, but so as to rapidly compare the second map data with the second sensor inputs received in real time, desirably, the second map data has the data having the same form as the second sensor inputs or having the similar form thereto. For example, the second map data may be map data produced by accumulating the second sensor inputs received from the second sensors 4 for a relatively long period of time.

On the other hand, the second map data is not limited in form, but desirably, it has grids. In this case, the grids include information on the mean of a dispersion of a height distribution of all points existing therein.

Furthermore, the grids include any one or more information selected from information on heights of all points existing therein, information on a height distribution, information on a dispersion of the height distribution, and information on the mean of the dispersion of height distribution. Further, the grids include information on the mean of a dispersion of a height distribution of continuous points among all points existing therein and a plurality of information as mentioned above. In case of a road close to a tree, for example, the ground exists together with the branch of tree extended laterally, and in this case, the mean of a dispersion of a height distribution of the ground and the mean of a dispersion of a height distribution of the branch are individually processed and included in the grids.

Figure 9:
FIG. 9 shows an example of a 3D point cloud as second map data inclusive of grids.
Figure 10:
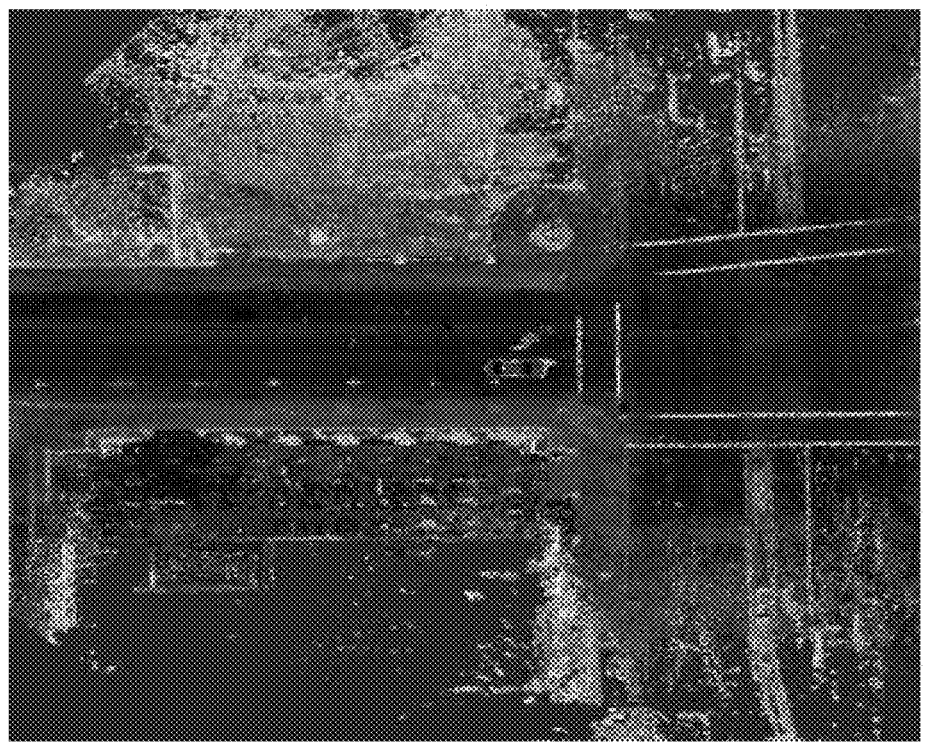
FIG. 10 shows an example of a local point cloud map on which the second sensor inputs match the second map data.

FIG. 9 shows an example of the second map data having the grids. One grid is a small size of 0.2 m*0.2 m, and accordingly, the grids are not easily distinguished. However, each point as shown in FIG. 9 includes the means of a dispersion of a height distribution of one grid and the additional information as mentioned above, which is a 3D point cloud. FIG. 10 shows an example on which the second sensor inputs match the 3D point cloud as the second map data, which is called LiDAR-based height map matching. Upon the map matching, an area used really on the whole LiDAR height map is an area around the position candidate group, and so as to separately define an interesting area of the map, the LiDAR height map is also called a local map or local point cloud map.

In the same manner as in the method for producing the first matching score group, on the other hand, the position candidate group of the ego vehicle 5 is a group from a current position to estimable positions to be located after moving for a given period of time, but unlike the first matching score group, the second sensor inputs and the second map data include the information on the lane markers and road markers as well as the information on the surrounding situations like the objects existing around the ego vehicle 5. According to the features of the present invention, above all, the second matching score group is produced with the use of static objects such as curb, building, forest, bus stop, traffic light, and so on, which are different from the lane markers, road markers, curb and traffic sign used for the production of the first matching score group, through the second sensors 4 different from the first sensors 2, thereby desirably improving accuracy in the estimation of the position of the ego vehicle 5.

Accordingly, the second matching score group is produced by means of the grids in the second map data. In more detail, the grids include the information on the mean of the dispersion of height distribution of all points existing therein, the information on heights, the information on height distribution, the information on dispersion of the height distribution, the information on the mean of the height distribution, and the information on the mean of dispersion of height distribution of continuous points existing therein, and with the use of any one or more information among the information, second matching scores for the respective position candidates in the position candidate group of the ego vehicle 5 can be calculated.

In this case, the calculation of the second matching scores has to be carried out for the same position candidate group as the position candidate group of the ego vehicle 5 for which the first matching scores are calculated, and accordingly, it is checked whether the second matching score group is consistent to the first matching score group, in step S150 as will be discussed later. In this case, if the above-mentioned examples are adopted, the second matching scores have to be calculated for the position candidate a assumed as the second lane position, the position candidate b assumed as the third lane position, and the position candidate c assumed as the fourth lane position.

In the calculation of the second matching scores, first, information on the grids matching the current position of the ego vehicle 5 is read, and next, the read grid information is compared with grid information matching the position candidate a assumed as the second lane position, grid information matching the position candidate b assumed as the third lane position, and grid information matching the position candidate c assumed as the fourth lane position. Accordingly, a high second matching score is given to the position candidates of the ego vehicle 5, which have a small information difference. As mentioned above, the grids include the information on the mean of the dispersion of height distribution of all points existing therein, the information on heights, the information on height distribution, the information on dispersion of the height distribution, the information on the mean of the height distribution, and the information on the mean of dispersion of height distribution of continuous points existing therein, and if a difference between the grid information is small, accordingly, the position candidate may be the same road connected to the road on which the ego vehicle 5 is current located. Contrarily, if a difference between the grid information is big, accordingly, the position candidate may be not the road on which the ego vehicle 5 is current located, but an object, such as a building, tree, or the like.

As mentioned above, the method for producing the second matching score group is just exemplary, and of course, the second matching score group may be produced through other methods. In all cases, however, the second matching score group is produced by means of the local height map as the results obtained by allowing the second sensor inputs to match the second map data.

Referring back to FIG. 1, the method for estimating the position of the ego vehicle will be explained.

If the second matching score group is produced, it is checked whether the first matching score group is consistent to the second matching score group by means of the autonomous driving apparatus 100 in step S150.

Figure 11:
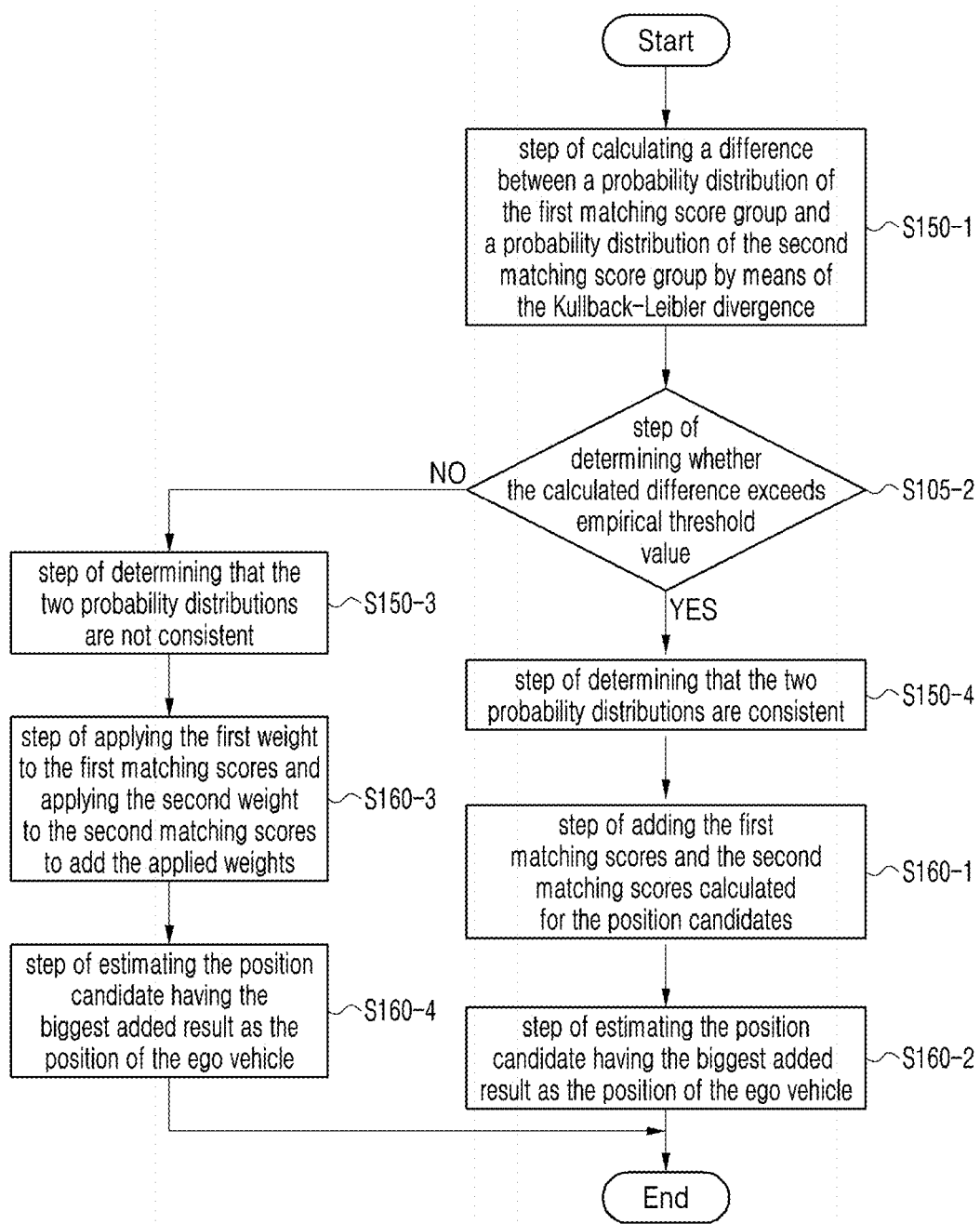
FIG. 11 is a flow chart showing detailed steps in a step S150 according to the present invention.

In more detail, as shown in FIG. 11, the step S150 includes the steps of: calculating a difference between a probability distribution of the first matching score group and a probability distribution of the second matching score group by means of a probability distribution comparison method in step S150-1; determining whether the calculated difference is over a given threshold value in step S150-2; if the calculated difference is over the given threshold value, determining that the two probability distributions are not consistent to each other in step S150-3; and if the calculated difference is under the given threshold value, determining that the two probability distributions are consistent to each other in step S150-4. In this case, the probability distribution comparison method is freely adopted, and for example, the Kullback-Leibler divergence (KLD) and Levene's test for equality of variances are representative. Otherwise, differences between the mean and variances of the two probability distributions may be directly compared with each other. Hereinafter, the Kullback-Leibler divergence as the probability distribution comparison method will be explained.

In this case, the given threshold value is a value set in advance, with which the difference between the probability distribution of the first matching score group and the probability distribution of the second matching score group calculated by means of the Kullback-Leibler divergence is compared to determine whether the two probability distributions are consistent or not. The given threshold value can be set as a free value by a designer of the autonomous driving apparatus 100. In this case, if the given threshold value is set small, results of determining that the two probability distributions are not consistent to each other are increased, which makes it possible to accurately estimate the position of the ego vehicle 5.

Figure 12:
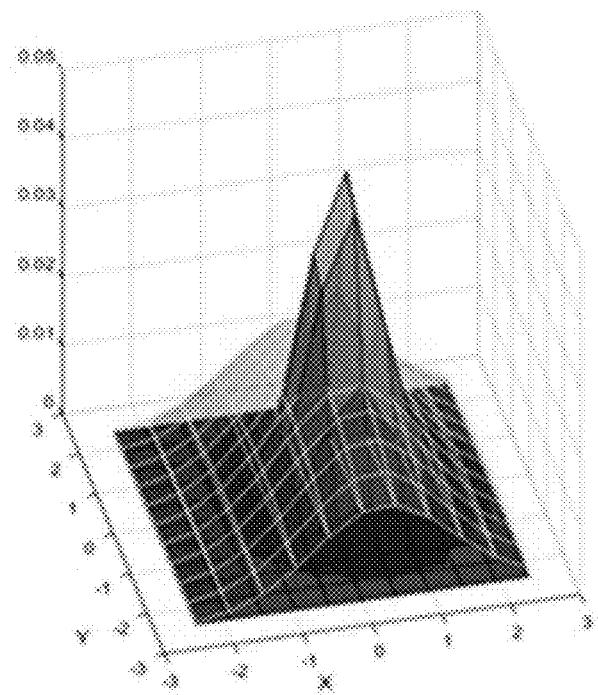
FIG. 12 visually shows the steps of calculating a difference between a probability distribution of a first matching score group and a probability distribution of a second matching score group by means of the Kullback-Leibler divergence.
Figure 12:
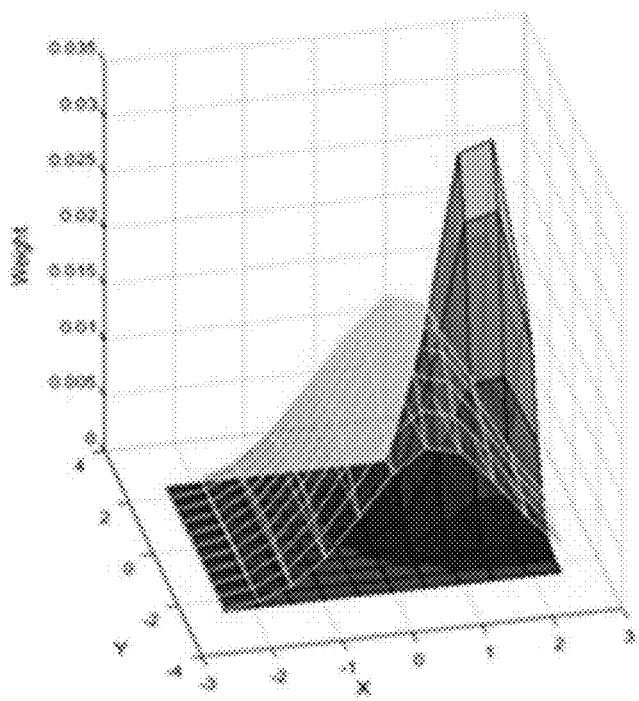

FIG. 12 shows the step of determining whether the difference between the probability distribution of the first matching score group and the probability distribution of the second matching score group calculated by means of the Kullback-Leibler divergence is over the given threshold value, in more detail, whether the two probability distributions are consistent or not. A graph in a shape of grids is the probability distribution of the first matching score group for the position candidate group of the ego vehicle 5 calculated with the first sensor inputs, and a graph in a shape of a sharp polygon is the probability distribution of the second matching score group for the position candidate group of the ego vehicle 5 calculated with the second sensor inputs. For the conveniences of the calculation, moreover, the two probability distributions are displayed with the grids, but they are not limited necessarily thereto. Even if random position candidate groups are provided, they are approximated to a multivariate probability distribution on the basis of the value, thereby calculating the respective probability distributions.

Referring to (a) of FIG. 12, in this case, a high point of the probability distribution of the first matching score group is consistent to a high point of the probability distribution of the second matching score group, and Referring to (b) of FIG. 12, contrarily, a high point of the probability distribution of the first matching score group is located at a left side from a high point of the probability distribution of the second matching score group. Accordingly, (a) of FIG. 12 shows that a difference between the two probability distributions is under the given threshold value, so that it is determined that the two probability distributions are consistent to each other, and contrarily, (b) of FIG. 12 shows that a difference between the two probability distributions is over the given threshold value, so that it is determined that the two probability distributions are not consistent to each other.

As mentioned above, the method for checking the consistency is just exemplary, and of course, the consistency may be checked through other methods. In all cases, however, the consistency is checked by means of the first matching score group and the second matching score group produced for the same position candidate group of the ego vehicle 5 as each other.

If the consistency is checked, the autonomous driving apparatus 100 estimates any one of the position candidates in the position candidate group of the ego vehicle 5 as the position of the ego vehicle 5 according to the consistency checking result in step S160.

As mentioned above, if the calculated difference is over the given threshold value, it is determined that the two probability distributions are not consistent to each other in the step S150-3, and if the calculated difference is under the given threshold value, it is determined that the two probability distributions are consistent to each other in the step S150-4. Referring to FIG. 11, the step S160 further includes the steps of: if the consistency checking result is "YES", adding the first matching scores and the second matching scores calculated for the position candidates in the position candidate group of the ego vehicle 5 in step S160-1; and estimating the position candidate having the biggest added result as the position of the ego vehicle 5 in step S160-2.

In this case, the step S160 will be explained in detail with the above-mentioned example. If the consistency checking result is "YES", the first matching scores and the second matching scores, which are calculated for the position candidate a assumed as the second lane position, the position candidate b assumed as the third lane position, and the position candidate c assumed as the fourth lane position as the position candidates in the position candidate group of the ego vehicle 5, are added, and the position candidate having the biggest added result is estimated as the position of the ego vehicle 5. In this case, the matching scores are calculated from the data received through the two kinds of sensors, not one sensor, and further, as the consistency is checked, the position candidate having the biggest added result can be estimated as the position of the ego vehicle 5.

If the consistency checking result is "NO", on the other hand, the position of the ego vehicle 5 is estimated through separate correction, which will be explained later in steps S160-3 and S160-4.

So far, the method for estimating the position of the ego vehicle according to the first embodiment of the present invention has been explained. According to the present invention, data is received from the different kinds of sensors, unlike the conventional autonomous driving apparatus, and after the analysis of the data, the consistency is checked to estimate the position of the ego vehicle 5. Accordingly, even if any one of the sensors does not work or there is an error on the data received from any one of the sensors, it is possible to accurately set the autonomous driving path, thereby enabling the autonomous driving apparatus 100 to have high reliability.

Hereinafter, an explanation on the case wherein the consistency checking result is "NO" and additional technical features for improving the accuracy in the estimation of the position of the ego vehicle 5 will be given.

Figure 13:
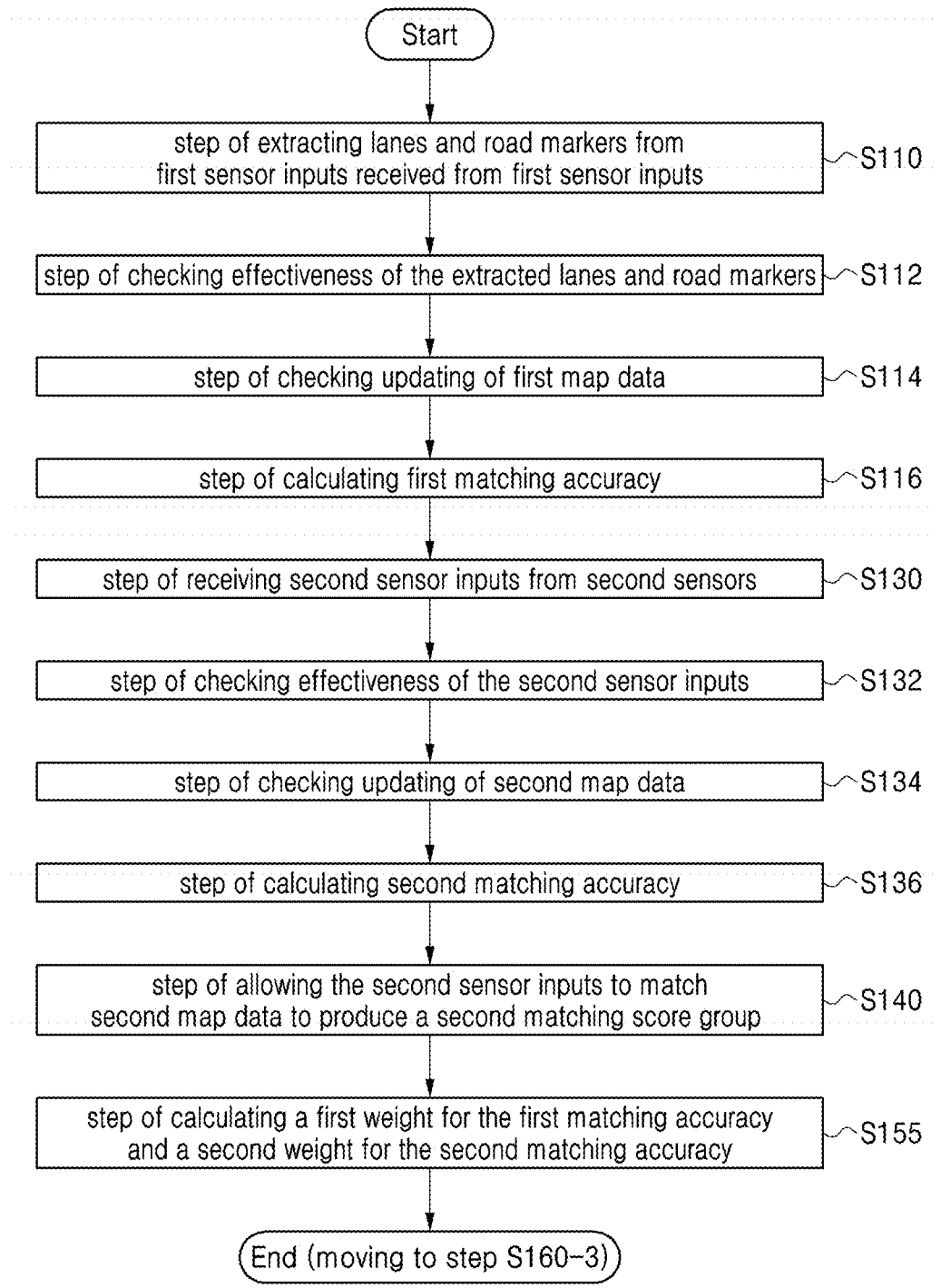
FIG. 13 is a flow chart showing representative steps in a method for estimating a position of an ego vehicle for autonomous driving according to a second embodiment of the present invention.

FIG. 13 is a flow chart showing representative steps in a method for estimating a position of an ego vehicle for autonomous driving according to a second embodiment of the present invention.

The flow chart as shown in FIG. 13 is desirable in accomplishing the objects of the present invention, but if necessary, of course, some steps may be added to or removed.

When compared with the method for estimating the position of the ego vehicle for autonomous driving according to the first embodiment of the present invention, the method for estimating the position of the ego vehicle for autonomous driving according to the second embodiment of the present invention further includes the data effectiveness checking step, the data updating checking step, and the weight calculating and applying step.

After the step S110 in which the visual road information such as lane markers, road markers, curb and traffic sign are extracted from the first sensor inputs, first, it is checked whether the visual road information including extracted lane markers, road markers, curb and traffic sign—are effective in step S112, and next, it is checked whether the first map data is updated in step S114. After the step S130 in which the second sensor inputs are received, it is checked whether the received second sensor inputs are effective in step S132, and next, it is checked whether the second map data is updated in step S134.

In this case, the steps S112 and S132 of checking the effectiveness are carried out by checking whether the visual road information such as extracted lane markers and road markers match the first map data and whether the second sensor inputs match the second map data, and therefore, the steps S112 and S132 are called sensor quantification.

In this case, if the sensor quantification for the first sensors is indicated by a mathematical expression, $k_{RN}\text{'}(x_c)=\exp(-\lambda_{RN} \Sigma_{i\in lanes}R(X_{I,Suff}^i-X_I^i))$, and if the sensor quantification for the second sensors is indicated by a mathematical expression, $k_H(X_H)=\exp(-\lambda_H R(X_{H,Suff}-x_H))$, wherein each of the $x_I^i$ and $X_{H,Suff}$ is a threshold point for the number of optimal features needed for extracting accurate position information, each of the $x_H$ and $x_I^i$ is the number of features currently received on the sensors, and the R(x) determines whether the number of features of the sensors for matching is sufficient or not, which is carried out by means of a sigmoid function or rectified unit.

On the other hand, in the steps S114 and S134 of checking the updating, since the first map data and the second map data are map data, the objects like buildings, roads and so on may be changed by new construction or removal, and accordingly, it is checked whether the first map data and the second map data are updated to reflect the current states of the objects well. The steps S114 and S134 are called map quantification. The local map for the current position of the ego vehicle 5 is retrieved from the whole map data, and it is then checked whether the local map has richful information.

In this case, if the map quantification for the first map data is indicated by a mathematical expression, $g_{RN}'(l_c, t) = \exp(-\lambda_s R(l_{C,Suff} - l_C)) P_{idx}(t)$, and if the map quantification for the second map is indicated by a mathematical expression, $g_L'(C_L, t) = \exp(-\lambda_s R(C_{L,Suff} - C_L)) P_{up2date}(t)$, wherein the R(x) determines whether the richness of the local map information for matching is over a given level, which has the almost same concept as the sensor quantification. The richness of the local map information means the richness of information within the radius of tens of meters from every position of the ego vehicle 5. Accordingly, the road network map as the first map data has sufficient information on the lane markers, road markers, curb and traffic sign within a given range, and the 3D point cloud as the second map data has information on various heights. Further, the $P_{up2date}(t)$ checks whether the map is updated, which is needed because the reliability of the map serving as ground truth in a map matching technique may be deteriorated due to changes of surrounding environments as time passes. In this case, since the second sensor-based second map data expressing the detailed 3D map information is relatively weak for time change, the $P_{up2date}(t)$ of the 3D point cloud map has a relatively more drastic decrement in reliability for the same time change than the road network map, which is thus approximated on the basis of the experimental verification.

If the updating is checked, first matching accuracy of the lane markers, road markers, curb and traffic sign and the first map data is calculated, in step S116, through the effectiveness checking result of the visual road information such as the lane markers and road markers and the updating checking result of the first map data, and second matching accuracy of the second sensor inputs and the second map data is calculated, in step S136, through the effectiveness checking result of the second sensor inputs and the updating checking result of the second map data.

In this case, the first matching accuracy is calculated through the sensor quantification of the first sensors as the effectiveness checking result of visual road information such as lane markers, road markers, curb and traffic sign-and the map quantification as the updating checking result of the first map data, and the second matching accuracy is calculated through the sensor quantification of the second sensors as the effectiveness checking result of the second sensor inputs and the map quantification as the updating checking result of the second map data. At this time, the respective checking results are quantified.

For example, the quantified first and second matching accuracy may be a function f(x) and mediating variables alpha and beta applied as inputs of the Dempster Shafer theory as will be discussed later or may be numbers or scores within a given range. In any case, they have to have the form of the inputs applied to the Dempster Shafer theory as will be discussed later to calculate weights.

If the first matching accuracy and the second matching accuracy are calculated, they are applied as the inputs of the Dempster Shafer theory as one of weight-based probability coupling methods to calculate a first weight for the first matching accuracy and a second weight for the second matching accuracy in step S155.

The Dempster Shafer theory is a known theory used for uncertainty handling, and if the Dempster Shafer theory is adopted in the present invention, it can be indicated by the following mathematical expressions.

$$m_S(A) = \begin{cases} m_S(\{H\}) = k'_H(x_H) \\ m_S(\{L\}) = k'_{RN}(x_C) \\ m_S(\{H, L\}) = \Theta_S \end{cases}$$

$$m_M(A) = \begin{cases} m_M(\{H\}) = g'_L(C_L) \\ m_M(\{L\}) = g'_{RN}(l_C) \\ m_M(\{H, L\}) = \Theta_M \end{cases}$$

$$\sum_{A \subset X} m(A) = 1$$

In this case, the $m_s(A)$ is the information on the matching reliability in the matching of the first sensors 2 and the matching of the second sensors 4 when seen in view of the sensors, which applies the sensor reliability value k(x) calculated in the sensor quantification to each math case $m_s(L)$, $m_s(H)$.

In this case, the mM(A) is the information on the matching reliability in the matching of the first sensors 2 and the matching of the second sensors 4 when seen in view of the maps, which applies the sensor reliability value k(x) calculated in the map quantification to each math case $m_M(H)$, $m_M(L)$, The $m_s(\{H, L\})$ is a value like $\Theta$ for a situation in which it is difficult to check the reliability in matching of the two sensors, and the sum of $m_s(\{H\})$, $m_s(\{L\})$, $m_s(\{H, L\})$ is normalized to be set to 1 by means of the Dempster Shafer theory.

The $m_{s,M}(A)$ is a result of totally considering the two math $m_s(A)$, mM(A) and the sum of the two math is calculated by the Dempster Shafer theory as follows:

$$m_{S,M}(H) = (m_S \oplus m_M)(H) = \frac{\sum_{B \cap C = H} m_S(B) m_M(C)}{1 - K}$$

$$m_{S,M}(L) = (m_S \oplus m_M)(L) = \frac{\sum_{B \cap C = L} m_S(B) m_M(C)}{1 - K}$$

$$K = \sum_{B \cap C = \Phi} m_S(B) m_M(C)$$

The $m_s(\{L\})$ is reliability in the matching of the second sensors 4 under total consideration for the sensor and map features, and the $m_{s,M}(\{L\})$ is reliability in the matching of the first sensors 2 under total consideration for the sensor and map features. The weight r is a value obtained by normalizing the two values.

$$r = \frac{m_{S,M}(\{H\})}{m_{S,M}(\{L\}) + m_{S,M}(\{H\})}$$

On the other hand, the first weight and the second weight are expressed with the term 'weight', but measurements as the map matching results for the position candidates may become the weights. Since the first sensors 2 and the second sensors 4 different from the first sensors 2 are used, the two measurements exist, and also, reliability weights used for the balancing of the two measurements may become the weights. The reliability weights can be considered as reliability of matching sources.

$$\hat{x}_k = \underset{x_k^i}{\operatorname{argmax}}\, p(x_k^i \mid z_k^{RN}, m_{RN})^{1-r} p(x_k^i \mid z_k^H, m_H)^r$$

The above mathematical expression is a mathematical expression related to pose estimation used to estimate the position of the ego vehicle 5, wherein the $x_k^i \mid z_k^{RN}, m_{RN}$ is the weight for the first sensors 2, the $X_k^i \mid Z_k^H, m_H$ is the weight for the second sensors 4, and the r is the reliability weight. Like this, the weights have ambiguous expressions, but it is understood that the weights are distinguishedly used in estimating the position of the ego vehicle 5.

After the first weight and the second weight are calculated, the step of estimating the position of the ego vehicle 5 through the separate correction is carried out if the consistency checking result is "NO" in the step S160 as mentioned above.

In more detail, if the consistency checking result is "NO", as shown in FIG. 11, the step S160 of estimating any one of the position candidates as the position of the ego vehicle 5 includes: the step S160-3 of applying the first weight to the first matching scores for the position candidates in the position candidate group of the ego vehicle 5 and applying the second weight to the second matching scores for the position candidates in the position candidate group of the ego vehicle 5 to add the applied weights; and the step S160-4 of estimating the position candidate having the biggest added result as the position of the ego vehicle 5.

In this case, the application of the first weight to the first matching scores and the application of the second weight to the second matching scores are carried out by means of operations like multiplication, and the step S160-4 is the same as the step S160-2, and for the brevity of the description, a detailed explanation on the step S160-4 will be avoided.

So far, the method for estimating the position of the ego vehicle for autonomous driving according to the second embodiment of the present invention has been explained. According to the present invention, the effectiveness of the lane markers, road markers, curb and traffic sign extracted from the first sensor inputs and the effectiveness of the second sensor inputs are checked, and the updating of the first map data and the second map data is checked, so that with the use of the checking results, the first matching scores and the second matching scores are corrected, thereby more improving the accuracy in the estimation of the position of the ego vehicle 5, and even if the consistency checking result is "NO", it is possible to more accurately estimate the position of the ego vehicle 5.

Figure 14:
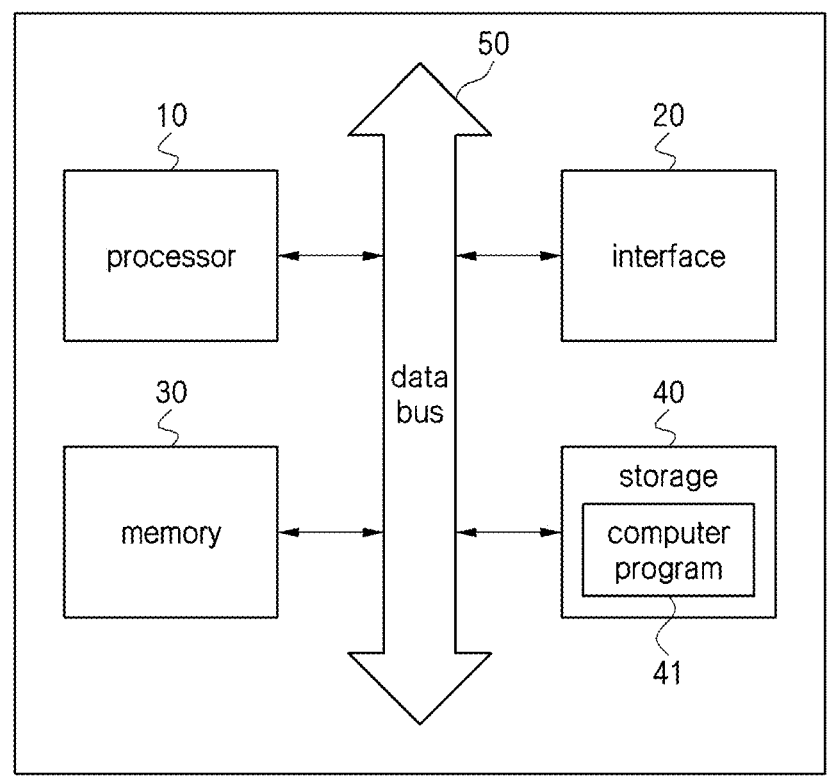
FIG. 14 is a block diagram showing a configuration of an autonomous driving apparatus for estimating a position of an ego vehicle according to a third embodiment of the present invention.

On the other hand, the methods for estimating the position of the ego vehicle for autonomous driving according to the first and second embodiments of the present invention are carried out by means of the autonomous driving apparatus 100 for estimating the position of the ego vehicle 5 according to a third embodiment of the present invention, and the autonomous driving apparatus 100 has the same technical features as the methods for estimating the position of the ego vehicle. In this case, as shown in FIG. 14, the autonomous driving apparatus 100 for estimating the position of the ego vehicle 5 according to the third embodiment of the present invention includes a processor 10, a network interface 20, a memory 30, a storage 40, and a data bus 50 for connecting them.

The processor 10 serves to control the whole operations of the respective parts. The processor 10 is any one of a CPU (Central Processing Unit), MPU (Micro Processor Unit), MCU (Micro Controller Unit), and a processor as widely known to the technical field related to the present invention. Moreover, the processor 10 performs operations for at least one application or program which implements the methods for estimating the position of the ego vehicle for autonomous driving according to the first and second embodiments of the present invention.

The network interface 20 supports wired and wireless internet communication of the autonomous driving apparatus 100 for estimating the position of the ego vehicle 5 according to the third embodiment of the present invention and further supports other known communication. Accordingly, the network interface 20 may have a communication module for the corresponding communication.

The memory 30 stores all kinds of data, command and/or information and loads one or more computer programs 41 from the storage 40 thereinto so as to perform the methods for estimating the position of the ego vehicle for autonomous driving according to the first and second embodiments of the present invention. In FIG. 14, a RAM as the memory 30 is shown, but of course, various storage media may be used as the memory 30.

The storage 40 non-temporarily stores one or more computer programs 41 and large-capacity network data. The storage 40 is any one of a non-volatile memory, such as ROM (Read Only Memory), EPROM (Erasable Programmable ROM), EEPROM (Electrically Erasable Programmable ROM), and flash memory, a hard disk, a detachable disk, and a recording medium readable by a computer, which is widely known to the technical field related to the present invention.

The computer program 41 is loaded to the memory 30 to perform an operation for receiving first sensor inputs from first sensors by means of the processor 10 to extract visual road information such as lane markers, road markers, curb and traffic sign from the received first sensor inputs, an operation for allowing the extracted visual road information such as lane markers, road markers, curb and traffic sign to match first map data to produce a first matching score group having first matching scores calculated with respect to position candidates in a position candidate group of the ego vehicle, an operation for receiving second sensor inputs from second sensors as the kind of sensor different from the first sensors, an operation for allowing the received second sensor inputs to match second map data to produce a second matching score group having second matching scores calculated with respect to position candidates in a position candidate group of the ego vehicle, an operation for checking the consistency between the first matching score group and the second matching score group, and an operation for estimating any one of the position candidates in the position candidate group of the ego vehicle as the position of the ego vehicle according to the consistency checking result.

On the other hand, the methods for estimating the position of the ego vehicle for autonomous driving according to the first and second embodiments of the present invention are carried out by means of a computer program stored in a medium according to a fourth embodiment of the present invention, and the computer program has the same technical features as the methods for estimating the position of the ego vehicle. Even though not described in detail for the brevity of the description, all technical features of the methods for estimating the position of the ego vehicle for autonomous driving according to the first and second embodiments of the present invention are applied to both of the computer program stored in a medium according to the fourth embodiment of the present invention and the autonomous driving apparatus 100 for estimating the position of the ego vehicle 5 according to the third embodiment of the present invention, thereby obtaining the same effects as each other.

As set forth in the foregoing, the autonomous driving apparatus according to the present invention is configured to receive data from the different kinds of sensors, to analyze the received data, and further to check the consistency of the data so as to estimate the position of the ego vehicle, unlike the conventional autonomous driving apparatus, so that even if any one of the sensors does not work or there is an error on the data received from any one of the sensors, it is possible to accurately set the autonomous driving path, thereby ensuring high reliability.

According to the present invention, in addition, the effectiveness of the lane markers, road markers, curb and traffic sign extracted from the first sensor inputs and the effectiveness of the second sensor inputs are checked, and the updating of the first map data and the second map data is checked, so that with the use of the checking results, the first matching scores and the second matching scores are corrected, thereby more improving the accuracy in the estimation of the position of the ego vehicle, and even if the consistency checking result is "NO", it is possible to more accurately estimate the position of the ego vehicle.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for estimating a position of an ego vehicle for autonomous driving, the method comprising the steps of:
    receiving first sensor inputs from first sensors to extract visual road information from the first sensor inputs by an autonomous driving apparatus;
    allowing the extracted visual road information to match first map data to produce a first matching score group having first matching scores calculated with respect to position candidates in a position candidate group of the ego vehicle by the autonomous driving apparatus;
    receiving second sensor inputs from second sensors as kinds of sensors different from the first sensors by the autonomous driving apparatus;
    allowing the received second sensor inputs to match second map data to produce a second matching score group having second matching scores calculated with respect to position candidates in a position candidate group of the ego vehicle by the autonomous driving apparatus;
    checking whether the first matching score group is consistent to the second matching score group by the autonomous driving apparatus; and
    estimating any one of the position candidates in the position candidate group of the ego vehicle as the position of the ego vehicle according to the consistency checking result by the autonomous driving apparatus,
    wherein the method further comprises:
    after the step of extracting the visual road information,
        checking whether the extracted visual road information is effective; and
        checking whether the first map data is updated, and
    after the step of receiving the second sensor inputs,
        checking whether the received second sensor inputs are effective; and
        checking whether the second map data is updated,
    wherein the method further comprises the steps of:
        calculating first matching accuracy of the visual road information and the first map data through the effectiveness checking result of the visual road information and the updating checking result of the first map data; and
        calculating second matching accuracy of the second sensor inputs and the second map data through the effectiveness checking result of the second sensor inputs and the updating checking result of the second map data.

2. The method according to claim 1, wherein the first sensors are camera sensors installed on the ego vehicle and the first map data is map data having visual road information such as lane markers, road markers, curb, and traffic sign.

3. The method according to claim 1, wherein the second sensors are scanning sensors installed on the ego vehicle and the second map data is three-dimensional (3D) point cloud map data.

4. The method according to claim 1, further comprising the step of applying the first matching accuracy and the second matching accuracy as inputs of a weight-based probability coupling method to calculate a first weight for the first matching accuracy and a second weight for the second matching accuracy.

5. The method according to claim 4, wherein the step of estimating any one of the position candidates as a position of the ego vehicle comprises the steps of:
    when the consistency checking result is "NO", applying the first weight to the first matching scores calculated for the position candidates in the position candidate group of the ego vehicle and applying the second weight to the second matching scores calculated for the position candidates in the position candidate group of the ego vehicle to add the applied weights; and
    estimating the position candidate having the biggest added result as the position of the ego vehicle.

6. The method according to claim 1, wherein the step of checking the consistency comprises the steps of:
    calculating a difference between a probability distribution of the first matching score group and a probability distribution of the second matching score group by means of a probability distribution comparison method; and
    determining whether the calculated difference exceeds empirical threshold value.

7. The method according to claim 1, wherein the step of estimating any one of the position candidates as a position of the ego vehicle comprises the steps of:
    when the consistency checking result is "YES", adding the first matching scores and the second matching scores calculated for the position candidates in the position candidate group of the ego vehicle; and
    estimating the position candidate having the biggest added result as the position of the ego vehicle.

8. An autonomous driving apparatus for estimating a position of an ego vehicle, comprising:
    one or more processors;
    a network interface;
    a memory for loading a computer program implemented by the processors; and
    a storage for storing large-capacity network data and the computer program,
    wherein the computer program performs:
    an operation for receiving first sensor inputs from first sensors to extract visual road information from the first sensor inputs received;
    an operation for allowing the extracted visual road information to match first map data to produce a first matching score group having first matching scores calculated with respect to position candidates in a position candidate group of the ego vehicle;

an operation for receiving second sensor inputs from second sensors as the kinds of sensors different from the first sensors;

an operation for allowing the received second sensor inputs to match second map data to produce a second matching score group having second matching scores calculated with respect to position candidates in a position candidate group of the ego vehicle;

an operation for checking consistency between the first matching score group and the second matching score group; and an operation for estimating any one of the position candidates in the position candidate group of the ego vehicle as the position of the ego vehicle according to the consistency checking result, wherein the computer program further performs:

after the operation for extracting the visual road information, an operation for checking whether the extracted visual road information is effective; and an operation for checking whether the first map data is updated, and after the operation for receiving the second sensor inputs, an operation for checking whether the received second sensor inputs are effective; and an operation for checking whether the second map data is updated, wherein the computer program further performs:

an operation for calculating first matching accuracy of the visual road information and the first map data through the effectiveness checking result of the visual road information and the updating checking result of the first map data; and an operation for calculating second matching accuracy of the second sensor inputs and the second map data through the effectiveness checking result of the second sensor inputs and the updating checking result of the second map data.

* * * * *